Jan. 14, 1936.　　　J. H. VICTOR ET AL　　　2,027,847
REENFORCE FOR GASKETS
Filed Jan. 17, 1934　　　2 Sheets-Sheet 1
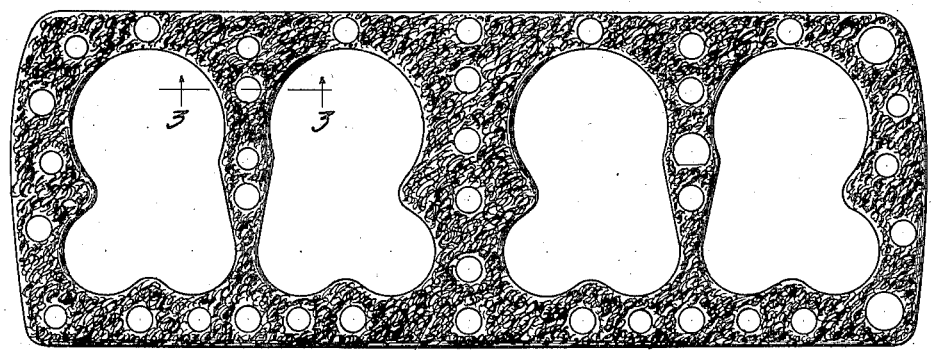
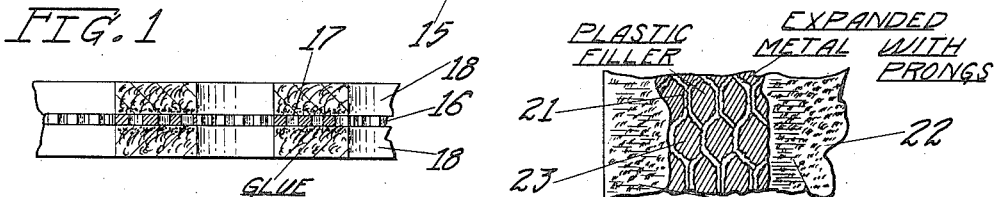
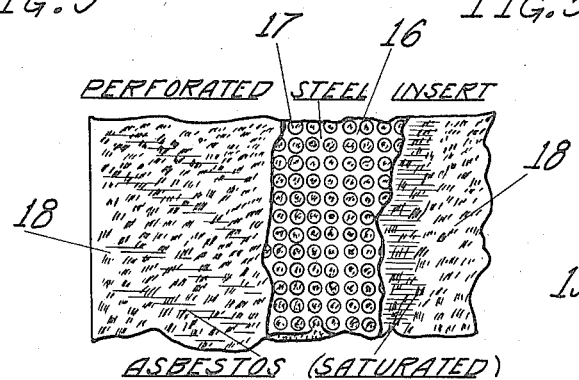
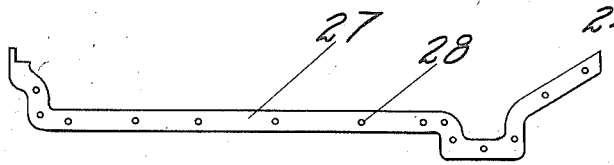
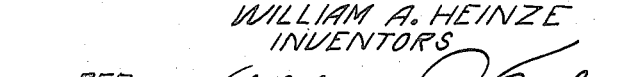
JOHN H. VICTOR
WILLIAM A. HEINZE
INVENTORS
PER　　Albert J. Fihe
ATTORNEY

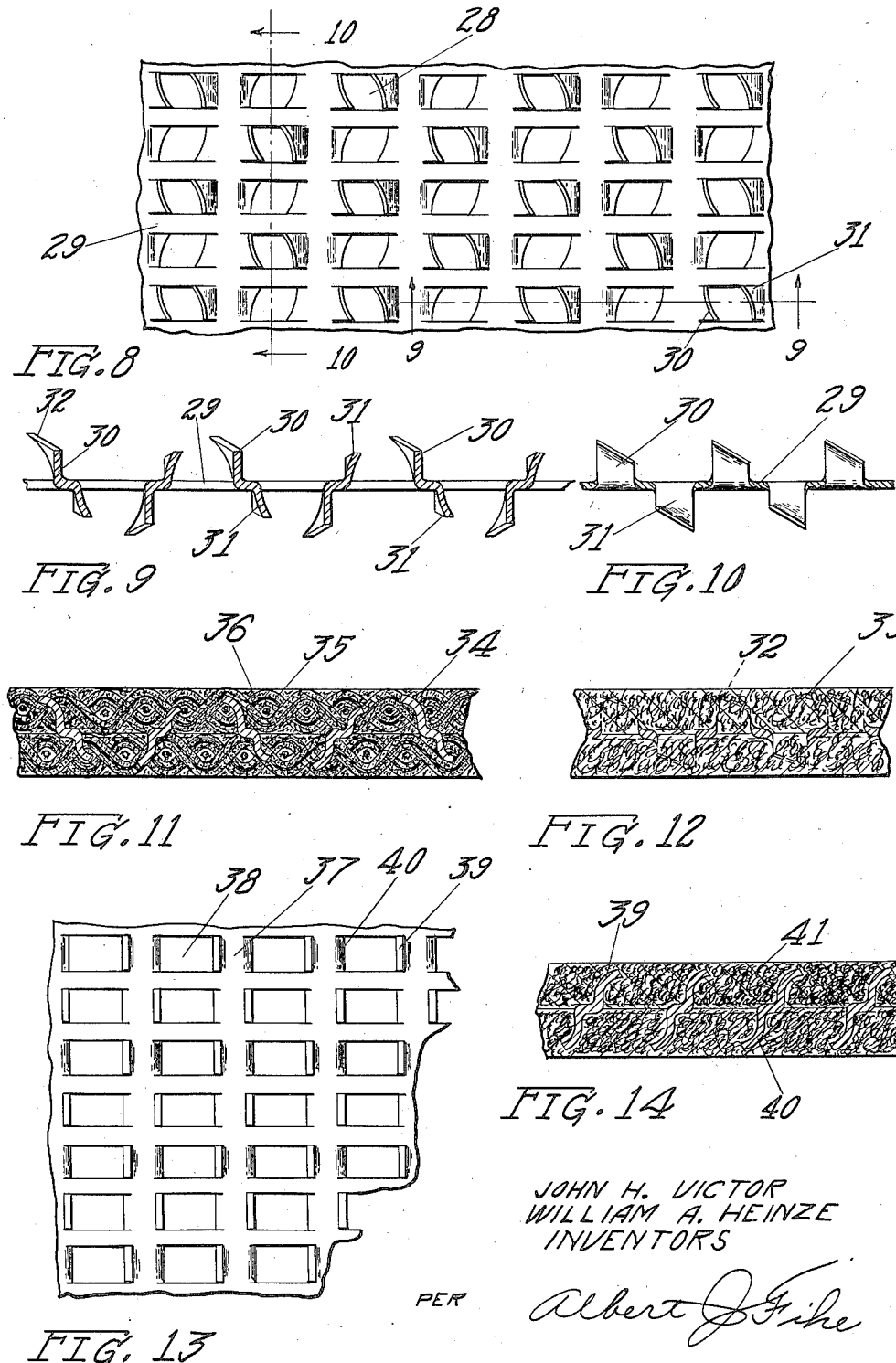

Patented Jan. 14, 1936

2,027,847

UNITED STATES PATENT OFFICE 2,027,847

REENFORCE FOR GASKETS

John H. Victor, Evanston, and William A. Heinze, Chicago, Ill., assignors to Victor Manufacturing & Gasket Company, Chicago, Ill., a corporation of Illinois Application January 17, 1934, Serial No. 706,930

1 Claim. (Cl. 288—1)

This invention relates to improvements in reenforced composition gaskets and has particular reference to that type of gasket used in internal combustion engines and the like, especially engines of the type known as high compression motors.

One of the important objects of this invention is to provide a gasket composed of asbestos or similar material reenforced with layers of metal or the like, which metal is preferably positioned between layers of the asbestos or other cushioning material, and with the layers or laminations secured in some suitable manner to each other.

Another important object of the invention consists in perforating the metal insert so as to provide for lightness without decreasing the required strength.

Still another important object is to provide an insert of expanded metal whereby an additional cushioning effect results while, at the same time, as in the case of the perforated metal, a complete union exists between the laminations.

Still another important object resides in the application of gasket material such as asbestos, paper, cork or the like to a solid sheet of metal on one or both sides thereof, and the subsequent shaping of the same into gaskets for various uses, the paper and cork being employed when great resistance to heat is not necessary.

Another and still further important object of the invention is to provide a gasket which includes a metal reenforcement having prongs struck out from one or both sides of the same, and with asbestos, paper, cork, cork composition or other similar impervious and impermeable material applied thereto in such a manner that the prongs of the reenforcement penetrate the cushioning material to such an extent that complete adherence between the various laminations results.

Another object is the construction of a gasket composed of sheets of what is known as wire woven asbestos, namely a layer composed of strands formed by covering the wires with asbestos or the like and woven into a fabric-like structure, the same being applied to one or both sides of a metal reenforcement such as above described.

A further and added important object comprises a novel construction of a metallic pronged insert wherein the prongs are formed in pairs from openings in the metal, one prong on one side and the other prong on the opposite side of the sheet.

Other and further important objects of the inventions will be apparent from the disclosures in the accompanying drawings and following specification.

The invention, in a preferred form, is illustrated in the drawings and hereinafter more fully described.

In the drawings:

Figure 1 is a plan view of a representative cylinder head gasket constructed in accordance with the principles of this invention.

Figure 2 is a detail view showing one of the modifications.

Figure 3 is a sectional view of the modification shown in Figure 2.

Figure 4 shows another modification illustrating the use of expanded metal.

Figure 5 is a still further modification of the embodiment shown in Figure 4.

Figure 6 illustrates an additional modification, showing a solid sheet of metal with paper or cork applied to the faces thereof.

Figure 7 illustrates a particular type of gasket made from the construction illustrated in Figure 6.

Figure 8 shows a novel form of metallic insert.

Figure 9 is a sectional view taken on the line 9—9 of Figure 8.

Figure 10 is a sectional view taken on the line 10—10 of Figure 8.

Figure 11 shows another modification of the invention wherein wire woven asbestos is applied to both faces of the metal insert such as that, for example, illustrated in Figures 8, 9 and 10.

Figure 12 illustrates the insert of Figures 8, 9 and 10 with plain asbestos or the like applied thereto.

Figure 13 shows a further modification of the invention wherein the prongs formed from each opening are directed upwardly and downwardly respectively.

Figure 14 is a sectional view of a gasket in which an insert is used similar to that shown in Figure 13.

As shown in the drawings:

The reference numeral 15 indicates generally a gasket constructed in accordance with the principles of this invention, the same representing a cylinder head gasket, and it might be mentioned at the outset that one of the important advantages to be derived from the use of metal inserts between asbestos layers in gaskets of this type is that a lateral transfer of heat from the combustion chamber through the gasket to the circulating water or other cooling medium is very effectively accomplished. This immediately provides for a longer life of the gasket and also insures a more efficient operation of the motor itself.

As best illustrated in Figure 2, the metal insert comprises a sheet of steel or the like 16 having a series of openings 17 therein, these openings being of a desired or satisfactory size and spacing so that a suitable strength of the reenforcing metal will result while, at the same time, a desired light weight is provided. Layers of asbestos 18 are applied to either or both sides of the perforated metal insert, this asbestos being preliminarily saturated with some composition which renders the same water, gasoline and oil proof. The construction of such a gasket is shown in more detail in the sectional view in Figure 3, and it will be noted that the layers of saturated asbestos have an opportunity to actually contact each other through the perforations or openings 17 in the steel insert 16, whereby suitable adhesion between the asbestos layers and the steel insert itself is provided, and a satisfactory integral structure results.

In this instance, as in all the other cases where metal inserts are used, as shown in the figures here, a brush coat of animal hide glue applied to the side of the asbestos sheet which contacts the metal will increase the adhesive qualities. This glue also serves as a binder which prevents oil leaks in the gasket, and, in addition to producing considerable adhesion between the asbestos and the metal core, makes for a better binder between the two sheets of asbestos wherever the same meet through the openings in the steel. This, of course, is rendered more efficient on account of the fact that the sheets of asbestos with the steel layer therebetween are run through a series of rollers under high pressure until the desired uniform thickness is attained. This uniformity of thickness is also imperative, especially in high compression engines where the ratio of the combustion space to the displacement of the piston is necessarily highly accurate.

The metal whether plain, perforated, expanded or having prongs struck therefrom is first thoroughly cleaned so as to remove all foreign matter, and is then usually dipped in oleum spirits. In the meantime, a brush coat of animal hide glue has been applied to one side of the asbestos sheets, the side being obviously that which is to be next to the metal, and the glue is allowed to thoroughly dry.

In the event of expanded metal or metal having prongs struck therefrom, the asbestos is applied to each side of the same, and the assembled structure is then put through first a series of rubber rollers to properly clinch the steel prongs into the asbestos. It is then put through a series of five or six pairs of steel rollers which are preferably steam-heated to some extent, each succeeding pair being spaced a slightly less distance apart, so that when the process is completed, the resultant product has been rolled down to the desired proper thickness and density.

After leaving the rolling machine, the sheets are then fed through a bath of specially prepared oils, usually comprising a mixture of China-wood, linseed oil, turpentine, and other oils, together with a suitable quantity of a drier such as manganese borate. These percentages are varied to accommodate different thicknesses of material and the time required for penetration, the oil solution being heated to a temperature of around 125 to 150° F. The length of time during which the material is allowed to remain in the bath depends upon the thickness of the material, the density of the asbestos used, and in some cases, the purpose for which the gasket is designed.

After the material comes out of the dip tank, the travel through the same being automatically machine controlled, it is then also automatically fed through a pair of rubber rollers acting as a wringer, after which it is immediately fed into an oven and heated to a temperature of from 250 to 350° F. The oven is provided with traveling conveyors upon which the material is piled, and the time required for baking and to decompose the oils is dependent upon the original time of saturation and the use to which the material is to be put. The oven is provided with ventilating stacks and damper controls, whereby the proper temperature is maintained, and after leaving the oven, the sheets are allowed to cool to room temperature. They are then fed through a machine in which graphite is applied to both surfaces of the asbestos, the graphite formula containing a suitable mixture of desired proportions of vegetable oils and driers as described above together with the necessary amount of graphite. The proportions of these ingredients used vary according to the amount of graphite coating desired.

After graphiting, the sheets are again baked for approximately fifteen minutes at a temperature of from 275 to 325° F. after which they are ready for the stamping operation wherein they are cut into gaskets of various shapes and sizes for cylinder heads, manifolds or the like.

The cylinder head gaskets are then put through a still further operation which consists in dipping the same into a forty or fifty per cent solution of sodium silicate and water, after which they are again dried in a furnace for ten minutes at a temperature of around 200° F. and are then ready for inspection, packing and shipping.

In the modification shown in Figure 4, the saturated asbestos layers 19 are applied to each side of a sheet of expanded metal 20, preferably with the preliminary application of glue. As best shown at 21 in Figure 5, the expanded metal can be provided with integral roughened edges, prongs or the like, whereby the asbestos 22 will adhere more firmly thereto. Obviously, the use of glue and the saturant acting upon the juxtaposed faces of the two asbestos layers through the meshes of the expanded metal will tend to greater and still more satisfactory adhesion. As additionally shown in Figure 5, the meshes of the expanded metal can, in any case, be preliminarily filled with some plastic or pulpy material 23, preferably having adhesive qualities, which would be rolled into the cavities or meshes of the expanded metal under pressure and dried, after which the sheets of asbestos 19 or 22 could be applied thereto. Synthetic resins may be conveniently employed here. The further operation, such as saturation, baking, graphiting, would then be carried out.

While steel inserts are mentioned, it will be obvious that copper, aluminum, and in fact, any other metal or metals suitable for the purpose can be employed. The use of expanded metal constitutes a distinct advantage for these reinforcing inserts, as a considerably more effective area is provided with the same weight of metal, and the angular offsetting of the expanded cut strips provides a pronounced cushioning effect against vertical pressures applied to the surfaces of the gasket. This is particularly valuable in cylinder head gaskets, and the solid walls of metal, in addition to providing a good lateral heat conductivity, also comprise barriers which prevent the blowing of the gasket, and leakage and seepage of liquids therethrough.

In Figures 6 and 7 are illustrated a gasket which is especially adapted for use with oil, water and gasoline joints, and wherein the gaskets used are generally thin and flexible, and are often quite large, irregular in shape, and consequently unstable and difficult to handle. Gaskets of this class are those used for oil pans, gear covers, crank cases and the like, and the use of a metal insert with outer facings of paper, cork, asbestos or the like produces a gasket which, in addition to being resistant to oil etc., is strong and substantial, not liable to breakage or damage in handling or installing, and which, furthermore, will not be subject, in any material degree, to undesirable shrinkage or expansion.

In the manufacture of gaskets of this type, sheets of paper 24, cork 25 or similar material are assembled with a sheet of thin metal 26 and are affixed to the faces of this metal sheet with cement or other suitable adhesive. As shown in Figure 6, the metal sheet is illustrated as solid, but obviously may be perforated, expanded or punched as desired or convenient. Pressure is applied to the assembled cemented sheets to securely retain the same in assembled relationship, and the gasket is then blanked or stamped from this sheet material, one embodiment being illustrated at 27 in Figure 7. By this method, the three strips or laminations of such a gasket are blanked at the same time from the sheet material, which insures exact registration of the edges of the strips and the production of a smooth and uniform product at minimum cost. In this case, especially when the metal is solid, it is found advantageous to provide a very thin reenforce. One of the main advantages of such a gasket is that bolt holes or the like 28 will always register so that non-uniformity and tearing is avoided. In this type of gasket, the reenforce should be of such a thickness that the gasket still remains flexible. Gaskets of this type are particularly useful in that they prevent seepage.

In Figures 8, 9 and 10, there is shown a metal reenforce which is produced by forming rectangular openings 28 in a metal sheet 29, the metal from the openings being punched alternately upwardly and downwardly into pairs of sharpened, curved and slightly twisted prongs 30 and 31 as best shown in Figures 9 and 10. The sharpening of these prongs results from obliquely cutting the pair punched from each opening, thus permitting variation in the length of the prongs as shown, and if desired, severance may be made off center providing different length prongs without altering the size or shape of the opening. The web or remaining fabric of the sheet 29 is preferably left flat, and there are no protuberances formed which would interefere with the assembling of these layers with asbestos sheets or the like, while, at the same time, the original dimensions of the sheets of asbestos are retained, there being no distortion which would result from bulges or protuberances of the metal. This is especially important in gaskets used for high compression motors wherein thicknesses must be gauged to a considerable degree of accuracy.

The sharpened outer corner 32 of each prong, as best shown in Figures 9, 10 and 12, enables a better penetration of the cushion material 33, and this oblique cutting of the prongs results in making each prong higher without increasing the size of the perforation. Furthermore, the twist provides a slightly curved effect which strengthens the prong and produces a better penetration of the asbestos layer. The fact that the outer portion of each prong is at an oblique angle to the direction of travel of the materials while being assembled produces a better clinching effect in the laminations and also provides an additional resistance against blow-outs by increasing the transverse distribution of metal.

The use of this metal reenforcement provides a springy or cushioning effect in the assembled gasket, as the terrific pressure necessary in assembling metals heretofore used is not needed in assembling gaskets made with reenforcements of this type.

In Figure 11 is shown a gasket which is particularly adapted for use with heavy duty motors wherein an inner layer of some expanded or punched metal fabric having prongs or the like 34 is employed, but instead of using plain asbestos paper or mill-board, sheets of wire woven asbestos are applied to the faces of the metal insert, preferably with the assistance of some adhesive such as glue and a saturant. The wire woven asbestos is composed of threads, each thread comprising a strand or strands of wire 35 about which is wound or otherwise applied an outer coating of asbestos or the like 36, these strands being then woven into an integral fabric as best shown in Figure 11, and after assembly and blanking, the usual saturation, baking and other finishing processes may be employed. It may be mentioned that in all of these types of gaskets, the combustion and water openings, and also the openings for the bolts and studs may be flanged or semi-flanged as desired or convenient. This flanging provides the necessary protection around these openings, and is particularly useful in conjunction with the wire woven asbestos gasket shown in Figure 11, as such flanges under pressure become embedded in the material, all of which, under the ordinary tension of the pressure required to seal the motor head, makes for a perfectly smooth surface on each face of the gasket. In some instances, the flanges around the water holes are omitted in order that the gasket may be slightly thicker around the rim of the combustion openings where the seal is most essential.

In Figures 13 and 14 is shown a still further type of metal reenforcement wherein a sheet of metal 37 has rectangular openings 38 formed therein, each opening thereby providing a pair of prongs 39 and 40 respectively, the first of which is turned upwardly and the second bent downwardly as best shown in Figure 14. The striking of one prong of each pair formed from an opening upwardly and striking the other downwardly provides more prongs per square inch, eliminates protuberances, and the so-called field of ferrules or rows extending at right angles across a sheet and also at angles of 45° is reduced by half. The bond of the asbestos to the sheet is far better, because of the closer relationship of the prongs, and the anchorage is greater because both opposed faces of the two sheets of the asbestos are definiately united through the opening, the prong on one side forcing the asbestos 41 on that side into the hole, while the same result is taking place from the other side. This clinching and binding action is very well illustrated in Figure 14. It will be evident that herein is provided a number of reenforced gasket constructions, all of which definitely produce a more satisfactory gasket and one which has considerable advantages over those previously developed.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A gasket reenforce, comprising a metal sheet having rectangular openings arranged therein, the metal displaced in forming said openings projecting outwardly in the form of prongs in pairs and at opposite ends of the openings, the pairs of prongs projecting alternately upwardly and downwardly, each prong being longer at one side edge than at its other side edge and having an inclined shearing outer end, the high corners of each pair of prongs being located diagonally opposite across the openings, said prongs being twisted to project the high corners thereof over the adjacent edges of the opening in the sheet to aid in penetrating and clinching the gasket material to the reenforce.

JOHN H. VICTOR.
WILLIAM A. HEINZE.